Sept. 20, 1960 J. DE GIER 2,953,635
DEVICE FOR REPRODUCING COLOR TELEVISION IMAGES
Filed March 15, 1956
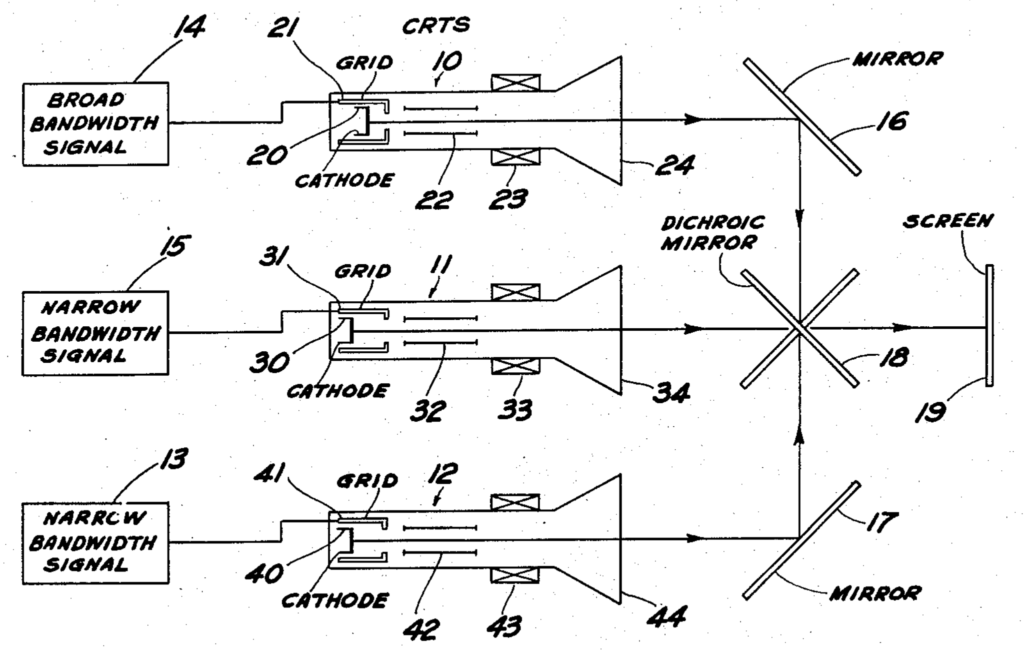
INVENTOR.
J. DE GIER
BY
Fred M. Vogel
AGENT.

United States Patent Office 2,953,635

Patented Sept. 20, 1960

2,953,635

DEVICE FOR REPRODUCING COLOR TELEVISION IMAGES

Johannes de Gier, Eindhoven, Netherlands, assignor, by mesne assignments, to North American Philips Company, Inc., New York, N.Y., a corporation of Delaware Filed Mar. 15, 1956, Ser. No. 571,637

Claims priority, application Netherlands Mar. 19, 1955

3 Claims. (Cl. 178—5.4)

This invention relates to devices for reproducing colour television images, comprising at least two cathode-ray tubes, in which the image to be reproduced appears on the screens in different colours, these images being united in optical respect to form one image.

For reproducing colour television images many systems have been suggested, which operate either by mechanical means or fully electronically. The present invention relates to a fully electronic device which utilises two or more cathode-ray tubes, of which the images each produced in a single colour are united in optical respect to form one image either with the use of plane mirrors only, or by utilising optical magnifying systems. In these methods the ultimate image is produced, for example, on a frosted screen.

In seeking a signal for colour television suitable for wireless transmission and having a total bandwidth which is not excessive, for example not larger than that of a signal such as used for black-and-white television, the discovery was made that it is not necessary for all primary colours from which the colour image is built up, to be transmitted with the same bandwidth. It has been found that for obtaining a satisfactory image it suffices if a signal of one colour is transmitted with a large bandwidth, this signal than determining the definition of the image reproduced. In many systems used nowadays three primary colours are transmitted, that is to say commonly red, green and blue. For visual observation it has been found best for the definition to be determined by the green image. However, for special purposes, it would also be possible for the definition to be determined by one of the other colours.

Although not known or described, it will be evident that what has been said above in regard to the bandwidths, also applies if two or more than three primary colours are used.

The recognition acquired in regard to the necessary bandwidths has not hitherto had any influence upon the construction of cathode-ray tubes for colour television for the above-mentioned system in which images each of a single colour produced in different tubes are united to form one image. Use is made of tubes which are wholly identical, apart of course from the fact that the screen in each tube emits light of a different colour under bombardment by electrons.

The object of the invention is to match the construction of the different tubes in such a device in a senseful way to the acquired recognition regarding the required bandwidth.

According to the invention, a device for reproducing colour television images comprises at least two cathode-ray tubes each having a screen on which the image to be reproduced appears in a different colour, which images are united in optical respect to form one colour image, each tube comprising an electron gun having at least a cathode, a control electrode and an anode, and the electron rays in each tube passing, after the anode, through a main lens which is located for all tubes at the same distance from the control electrode and for all tubes at the same distance from the screen, the different control electrodes having supplied to them signals of different bandwidths, and it is characterized in that in a tube to which a signal of larger bandwidth is supplied, the surface area of the image point with maximum focusing of the electron ray and with the same current strength is smaller than in a tube in which a signal of smaller bandwidth is supplied to the control electrode.

The invention affords the advantage that each cathode-ray tube in the device according to the invention has specific cathode load (this is the current per $cm.^2$ of the active cathode surface) which is not higher than required. Since the specific cathode load substantially determines the life of a cathode-ray tube, as is well-known, the maximum possible life is thus obtained for each cathode-ray used in a device according to the invention. This may be explained as follows.

A larger image point on the screen means, since the main lens occupies the same position and the focusing is maximum for the tubes being compared, that the cross-over, which, as is well-known, is formed in the vicinity of the control electrode, is larger, the cross-over of the tubes constituting the object of which the main lens produces an image, viz. the image point. However, a larger cross-over means a low specific cathode load. Since the size of the cross-over is also dependent upon the strength of the current in the electron ray, comparison must, of course, be made with the same current strength. However, this does not imply that during the operation of a device according to the invention all tubes are operated with the same current strength. This point will be referred to hereinafter in detail.

The size of the cross-over is determined not only by the current strength in the electron ray, but also by the size of the aperture and the thickness of the control electrode, the distance between the cathode and the control electrode and the distance between the control electrode and the anode. A larger cross-over with a given current strength may be obtained, for example, by means of a larger aperture in the control electrode and/or a larger distance between the cathode and the control electrode. Consequently, a determined size of the cross-over and hence of the image point on the screen may for a determined current strength be obtained by means of variations in the geometry of the electron gun.

Consequently, in a device according to the invention, when compared under conditions of the same current strength in the electron rays, a signal of larger bandwidth corresponds to a tube having a smaller image point, and conversely.

If the conversion of the energy of incident electrons into light for each screen of the tubes in a device according to the invention would be the same, the tubes could be operated with equal current strength. This condition is fulfilled only rarely, if the screens are coated with luminescent substances. In order to obtain an image of homogeneous colour, the current strength in a tube having a screen of low conversion output must during operation be greater than in a tube having a screen of a high output and conversely. It is thus possible that a tube having supplied to it a signal of smaller bandwidth requires a current strength which because of the low output of the luminescent material is higher than a tube to which a signal of greater bandwidth is supplied, but in which the luminescent material has a higher conversion output. However, for the required current strength, the specific cathode load in all tubes is minimum and hence the life of all tubes is a maximum.

A very simple means of decreasing the specific cathode load is to utilise a control electrode having a larger aperture and a larger distance between the cathode and the control electrode.

A larger aperture of the control electrode results in a decrease of the so-called cut-off voltage, that is the voltage of the control electrode for which the electron current is wholly suppressed. By suitably increasing the distance between the cathode and the control electrode it is now possible for the cut-off voltages to be substantially equalised for the different tubes, thus avoiding a complicated circuit as would be required if tubes with different cut-off voltages were used.

In order that the invention may readily be carried into effect, it will now be described, by way of example, with reference to one practical embodiment of the device for visual observation which utilises three cathode-ray tubes having screens luminescent in green, red and blue, respectively. The luminescent materials used are willemite for the green image, zinc-beryllium silicate activated with manganese for the red image, and calcium magnesium silicate activated with titanium for the blue image. The conversion output of the three substances is different, that is to say maximum for the willemite.

Since the device was intended for visual observation, the definition had to be determined by the green image. The image points in the tube having the green luminescent screen thus had to be smallest.

Owing to the high conversion output of willemite, the current strength of the electron ray in the tube concerned could be smallest. With a line width of 0.033 mm., which line width corresponds to spot size, a sharp image was obtained for a current strength of 90 $\mu$amps. The specific cathode load in this tube was 0.146 amp./cm.$^2$.

With the same line width in the tube having the red luminescent screen, a current strength of the electron ray of 200 $\mu$amps. was required for an image having a brightness which matched the green image. The specific cathode load in this tube was 0.28 a./cm.$^2$. It has been found that the line width in this tube could be increased to 0.065 mm. without the image produced by combination of the images of the different tubes suffering therefrom. However, the current strength had to remain 200 $\mu$amps., but the specific cathode load was decreased to 0.19 amp./cm.$^2$ as a result of this larger image point.

With the same line width as that measured in the tube having the green luminescent screen, a current strength of the electron ray of 120 $\mu$amps. was found in the tube having the blue luminescent screen for an image having a brightness which matched the green and red images. The specific cathode load in the tube having the blue image was 0.174 a./cm.$^2$. It has been found that the line width in this tube could likewise be increased to 0.065 mm. without the combination image suffering therefrom. However, the current strength remained 120 $\mu$amps. The specific cathode load was reduced to 0.126 a./cm.$^2$ as a result of the increased line width.

The diameter of the aperture of the control electrode in the tube having the green image was 0.5 mm. that in the tube having the red image was 0.6 mm. and that in the tube having the blue image also 0.6 mm.

The cut-off voltage in this device was 60 volts for all tubes. The distance between the control electrode and the cathode was 0.2 mm. in the tube having the green image and 0.25 mm. in the tubes having the red and the blue image, respectively.

The thickness of the control electrodes and the distance between this electrode and the anode were the same in all tubes.

The sole figure of the accompanying drawing is a schematic representation of the device of the invention. It comprises three cathode-ray tubes 10, 11, and 12. The top tube 10 comprises a cathode 20, a control grid 21, an anode 22, and a focussing coil or main lens 23 producing an electron beam incident on a screen 24 producing a particular, colored image. The center tube 11 comprises a cathode 30, a control grid 31, an anode 32, and a main lens or focussing coil 33 producing an electron beam incident on a screen 34 producing a different color image. The bottom tube 12 comprises a cathode 40, a control grid 41, an anode 42, and a focussing coil or main lens 43 producing an electron beam incident on a screen 44 producing still a further color image. The phosphor in the screen 24 has a higher efficiency or output than those of the screens 34 and 44. To the grid 21 of the upper tube 10 is supplied the signal of larger bandwidth from a source 14. To the grids 31 and 41 of the center and lower tubes 11 and 12 are supplied signals of smaller bandwidth from sources 15 and 13. The images on the three screens are combined by suitable optical means comprising two plane mirrors 16 and 17 and a color-discriminating dichroid mirror 18 to form a composite image on a projection screen 19. As will be noted, the cathode-grid spacing and grid aperture of the top tube are both smaller than the corresponding dimensions of the other two tubes 11 and 12.

What is claimed is:

1. A color television reproducing device comprising three cathode-ray tubes producing images of the same size in green, red and blue, respectively; each of said tubes comprising an electron-responsive, image screen, an electron gun including cathode and apertured control grid electrodes, and a main focussing lens spaced from the control grid and the image screen the same distance for all three tubes; optical means to unite said three color images to form a composite image; the cathode and apertured control grid portion of the gun in the green-image-producing tube having dimensions different from that of the other guns at which the former produces a beam spot size at the associated image screen that is smaller than that produced by both of the other guns, when compared under conditions of equal beam current and maximum focussing by the associated main lens; the green-image-producing tube containing an image screen constituted of a phosphor whose light output at a predetermined beam current is substantially greater than that of the phosphors constituting the image screens of the two other tubes; a source of signals having larger and smaller bandwidths; and means for applying only to the said one gun producing a smaller beam spot the signal having the larger bandwidth and to both of the other guns signals of smaller bandwidth.

2. A color television reproducing device comprising plural cathode-ray tubes producing images of the same size; each of said tubes comprising an electron-responsive, image screen producing a different color image, an electron gun including cathode and apertured control grid electrodes, and a main focussing lens spaced from the control grid and the image screen the same distance for all of the tubes; optical means to unite said different color images to form a composite image; the cathode and apertured control grid portion of one of said guns only having different dimensions than that of the other guns at which the said one gun produces a beam spot size at the associated image screen that is smaller than that produced by any of the other guns, when compared under conditions of equal beam current and maximum focussing by the associated main lens; the tube containing said one gun having an image screen constituted of a phosphor whose light output at a predetermined beam current is substantially greater than that of the phosphors constituting the image screens of the other tubes; a source of signals having larger and smaller bandwidths; and means for applying only to the said one gun producing a smaller beam spot the signal having the larger bandwidth and to all the other guns signals of smaller bandwidth.

3. A device as set forth in claim 2 wherein, in the said one gun, the control grid aperture is smaller than, and the control grid-cathode spacing is smaller than, the corresponding values for the other guns.

References Cited in the file of this patent

UNITED STATES PATENTS

| | | |
|---|---|---|
| 2,335,180 | Goldsmith | Nov. 23, 1943 |
| 2,509,038 | Goldsmith | May 23, 1950 |
| 2,590,240 | Epstein | Mar. 25, 1952 |
| 2,642,487 | Schroeder | June 16, 1953 |
| 2,677,722 | Bedford | May 4, 1954 |
| 2,825,753 | Hausz | Mar. 4, 1958 |